United States Patent
Suganuma et al.

(10) Patent No.: US 8,897,335 B2
(45) Date of Patent: Nov. 25, 2014

(54) FURNACE FOR DEHYDRATING AND SINTERING POROUS GLASS PREFORM

(75) Inventors: Ichihiko Suganuma, Tokyo (JP); Tatsuya Taniguchi, Tokyo (JP)

(73) Assignee: Furukawa Electric Co., Ltd., Tokyo (JP)

(*) Notice: Subject to any disclaimer, the term of this patent is extended or adjusted under 35 U.S.C. 154(b) by 933 days.

(21) Appl. No.: 13/041,675

(22) Filed: Mar. 7, 2011

(65) Prior Publication Data

US 2011/0222575 A1 Sep. 15, 2011

(30) Foreign Application Priority Data

Mar. 9, 2010 (JP) .................................. 2010-051440

(51) Int. Cl.
*C03B 5/02* (2006.01)
*C03B 37/014* (2006.01)

(52) U.S. Cl.
CPC .................................. *C03B 37/0146* (2013.01)
USPC .......................................................... 373/27

(58) Field of Classification Search
CPC ........................ C03B 37/01853; C03B 37/025
USPC ............... 373/27, 29–35, 109, 111, 116, 118; 65/379, 422, 426, 427, 489, 500, 507, 65/530, 533, 537; 219/635; 432/206–209
See application file for complete search history.

(56) References Cited

U.S. PATENT DOCUMENTS

| 5,106,401 A | * | 4/1992 | Ishikawa et al. | ................. 65/398 |
| 5,114,338 A | * | 5/1992 | Tsuchiya et al. | ............... 432/206 |
| 5,513,983 A | * | 5/1996 | Ito et al. | ......................... 432/205 |

FOREIGN PATENT DOCUMENTS

| JP | 2000-226217 | | 8/2000 |
| JP | 2006076861 | * | 3/2006 |

OTHER PUBLICATIONS

English Language Translation of JP2000226217 (Cited by Applicant in IDS).*
English Language Translation of JP2000226217, Aug. 15, 2000 (Cited by Applicant in IDS dated Mar. 7, 2011).*

* cited by examiner

*Primary Examiner* — Dana Ross
*Assistant Examiner* — Joseph Iskra
(74) *Attorney, Agent, or Firm* — Oblon, Spivak, McClelland, Maier & Neustadt, L.L.P.

(57) ABSTRACT

A furnace for dehydrating and sintering a porous glass preform includes a core tube that passes through a center portion of a furnace body to accommodate therein the porous glass preform, a heater that is arranged around the core tube in the furnace body to heat the porous glass preform in the core tube, and a core tube weight dividing and bearing means that is arranged at an outer periphery of the core tube to divide and bear the weight of the core tube in its longitudinal direction. The core tube weight dividing and bearing means includes a plurality of collars that is protruded at a predetermined interval in the longitudinal direction at the outer periphery of the core tube, a first weight receiving means that supports the collars at the outer periphery of the core tube, and a second weight receiving means that bears the weight of the first weight receiving means.

4 Claims, 8 Drawing Sheets

(a)

(b)

(c)

(a)

(b)

(c)

FURNACE FOR DEHYDRATING AND SINTERING POROUS GLASS PREFORM

CROSS-REFERENCE TO RELATED APPLICATIONS

This application is based upon and claims the benefits of priorities from the prior Japanese Patent Application No. 2010-051440, filed on Mar. 9, 2010; the entire contents of which are incorporated herein by reference. This application also incorporates by reference the entire contents of Japanese application, 2009-062338 filed in Japan on Mar. 16, 2009.

BACKGROUND OF THE INVENTION

1. Field of the Invention

The present invention relates to a dehydration-sintering furnace for dehydrating and sintering a porous glass preform to obtain transparent glass.

2. Description of the Related Art

As illustrated in FIG. 8, a furnace 1 for dehydrating and sintering a porous glass preform includes a core tube 3, a heating body 5, a muffle tube 6, and a heat insulating member 7 as main components. The core tube 3 is made of quartz glass and the like and passes through a center portion of a furnace body 2 to accommodate therein a porous glass preform 4 supported by a supporting rod 10. The heating body 5 is arranged around the core tube 3 in the furnace body 2 to heat the porous glass preform 4 in the core tube 3. The muffle tube 6 is arranged to surround the outer periphery of the core tube 3 between the core tube 3 and the heating body 5. The heat insulating member 7 is arranged along an inner wall of the furnace body 2 at the outer side of the heating body 5. As another component, a gas supply port 8 is arranged at the lower part of the core tube 3. Gas, such as inert gas, necessary for dehydrating and sintering the porous glass preform 4 is supplied from the gas supply port 8. Furthermore, a gas exhaust tube 9 is arranged at the upper part of the core tube 3 to discharge the gas supplied from the gas supply port 8. Inert gas such as Ar and $N_2$ is supplied into the furnace body 2.

The dehydration and sintering of a porous glass preform using such a dehydration-sintering furnace are carried out by relatively moving the porous glass preform in the up and down directions with respect to the heating body. For example, the dehydration and sintering may be carried out by moving the porous glass preform in the up and down directions with respect to the fixed heating body. Alternatively, the dehydration and sintering may be carried out by moving heating zones formed by a plurality of heating bodies in the up and down directions while fixing the porous glass preform. The movements of the heating zones are executed by switching the energization of the heating bodies.

With demands for optical fibers in recent years, larger and longer porous glass preforms for optical fiber are developed and thus larger furnaces for dehydrating and sintering the same to obtain glass are becoming necessary. However, a core tube is also becoming larger and larger with enlargement of the furnace, and thus the core tube made of quartz glass and the like may be deformed due to a buckling phenomenon caused by its own weight during heating.

Therefore, a method for providing collars at the outer periphery of a core tube and arranging muffle tubes above and below each collar to divide and bear the weight of the core tube in the longitudinal direction and to prevent the buckling deformation of the core tube has been known as disclosed in, for example, Japanese Patent Application Laid-open No. 2000-226217.

In recent years, the buckling deformation of the core tube cannot be prevented using such method due to further enlargement in the dehydration-sintering furnace.

SUMMARY OF THE INVENTION

The present invention has been achieved in view of the above problems, and an object of the invention is to provide a furnace for dehydrating and sintering a porous glass preform that can suppress the buckling deformation of a core tube caused by its own weight at the time of high-temperature heating even when a large-sized core tube is used.

According to an aspect of the present invention, there is provided a furnace for dehydrating and sintering a porous glass preform. The furnace includes: a core tube that passes through a center portion of a furnace body to accommodate therein the porous glass preform; a heating body that is arranged around the core tube in the furnace body to heat the porous glass preform in the core tube; and a core tube weight dividing and bearing unit that is arranged at an outer periphery of the core tube to divide and bear a weight of the core tube in a longitudinal direction thereof, in which the core tube weight dividing and bearing unit includes a plurality of collars that is protruded at a predetermined interval in the longitudinal direction at the outer periphery of the core tube, a first weight receiving unit that supports the collars at the outer periphery of the core tube, and a second weight receiving unit that bears a weight of the first weight receiving unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A furnace for dehydrating and sintering a porous glass preform according to embodiments of the present invention will be described below.

Figure 1:
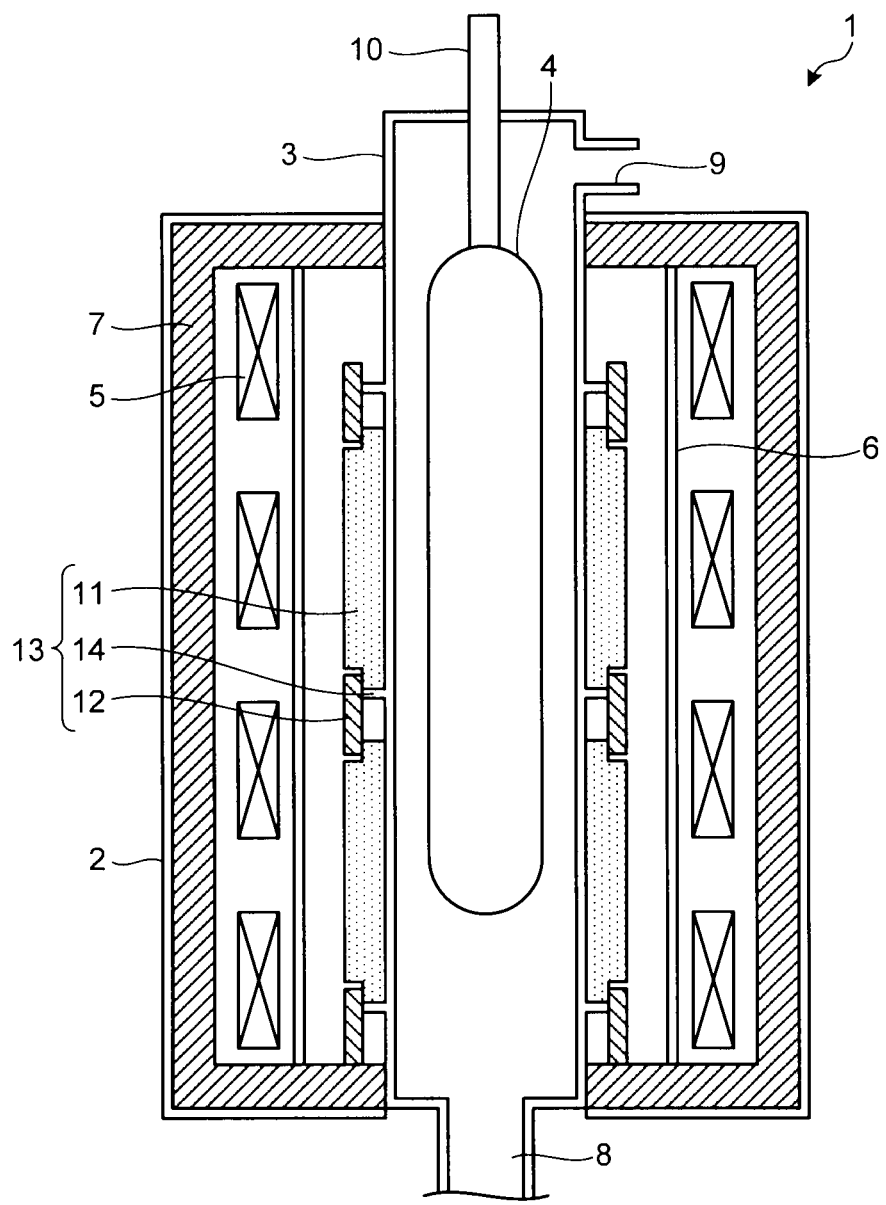
FIG. 1 is a cross-sectional view illustrating a furnace for dehydrating and sintering a porous glass preform according to a first embodiment.
Figure 2:
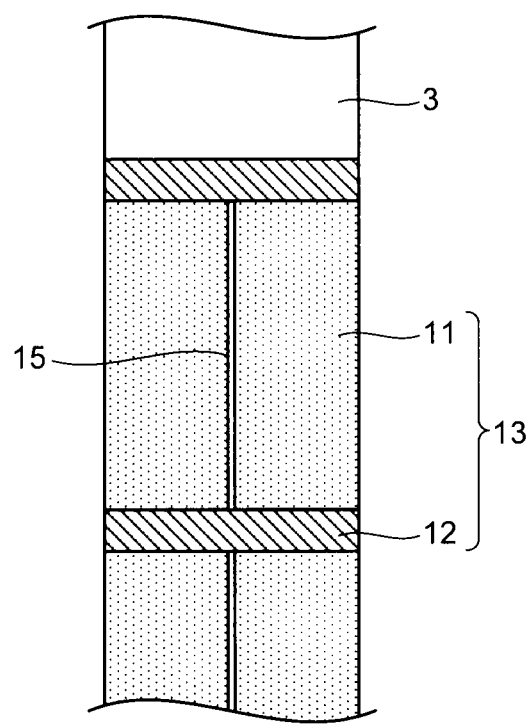
FIG. 2 is a schematic view illustrating the configuration of a core tube weight dividing and bearing means included in the furnace for dehydrating and sintering a porous glass preform according to the first embodiment.

FIGS. 1 and 2 illustrate a furnace for dehydrating and sintering a porous glass preform according to a first embodiment of the present invention. FIG. 1 is a longitudinal cross-sectional view of the dehydration-sintering furnace and FIG. 2 is a schematic view illustrating the configuration of a core tube weight dividing and bearing means that is used in the dehydration-sintering furnace.

A furnace 1 for dehydrating and sintering a porous glass preform 4 illustrated in FIG. 1 includes a core tube weight dividing and bearing means 13 that is arranged at the outer periphery of a core tube 3 made of quartz to divide and bear the weight of the core tube 3 in the longitudinal direction.

The core tube weight dividing and bearing means 13 includes a plurality of collars 14 made of quartz that is arranged at a predetermined interval in the longitudinal direction at the outer periphery of the intermediate portion of the core tube 3, a first weight receiving means 11 that supports the collars 14 at the outer periphery of the core tube 3, and a second weight receiving means 12 that supports the first weight receiving means 11.

The first weight receiving means 11 is configured by short muffle tubes 11 of which each is interposed at the outer periphery of the core tube 3 between the adjacent up-and-down collars 14 to bear the weight of the core tube 3 acting on the upper-side collar 14.

The second weight receiving means 12 is configured by muffle tube holders 12 of which each is interposed at the outer periphery of the collar 14 of the core tube 3 between the adjacent up-and-down short muffle tubes 11 to bear the weight of the short muffle tube 11 acting on the upper-side short muffle tube 11.

Figure 3:
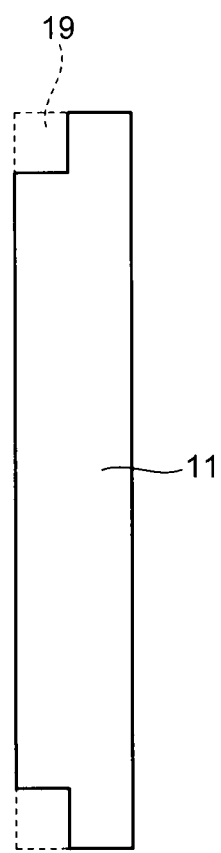
FIG. 3 is a cross-sectional view illustrating a short muffle tube included in the furnace for dehydrating and sintering a porous glass preform according to the first embodiment.

The short muffle tube 11 illustrated in FIG. 2 includes a dividing portion 15 that is placed along the longitudinal direction to facilitate the attachment, and thus has a halved structure. As illustrated in FIG. 3, the short muffle tube 11 includes thin-walled portions 19 that are placed at the upper and lower ends, where the inner diameter is constant but the outer diameter is small at the upper and lower ends. The short muffle tube 11 is made of carbon fiber-reinforced carbon, and the like.

The muffle tube holder 12 has a ring shape and is arranged to be fitted to the thin-walled portions 19 of the short muffle tube 11. The short muffle tube 11 and the muffle tube holder 12 are thereby stably fixed, and the assembly is facilitated. The muffle tube holder 12 is made of carbon fiber-reinforced carbon and the like similarly to the short muffle tube 11.

Figure 4:
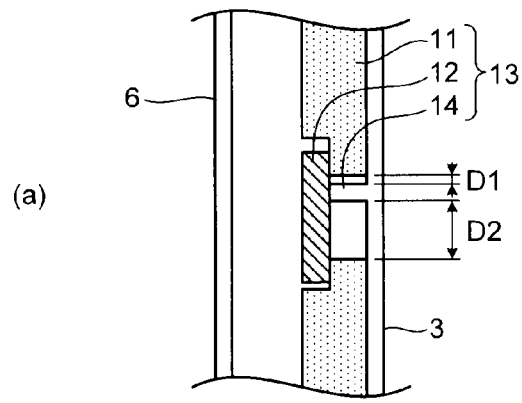
FIGS. 4A, 4B, and 4C are cross-sectional views schematically illustrating a deformation process by heat of a core tube in the furnace for dehydrating and sintering a porous glass preform according to the first embodiment.
Figure 4:
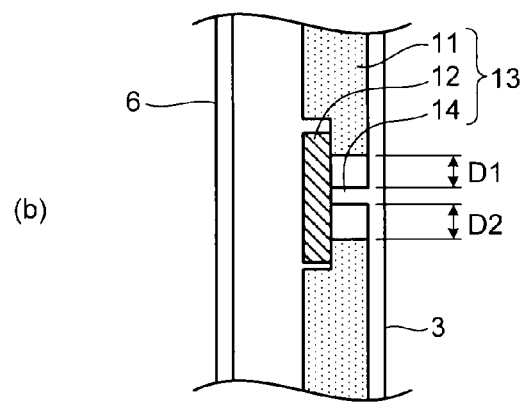
Figure 4:
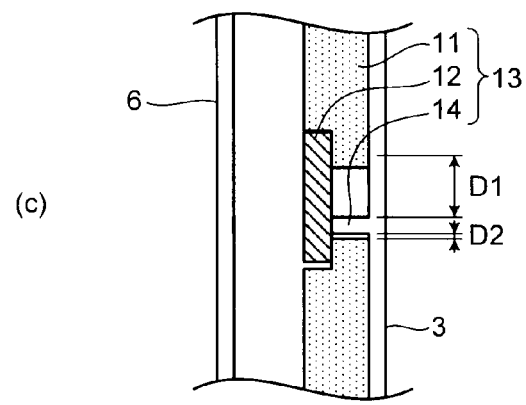

A deformation process by heat of the dehydration-sintering furnace according to the first embodiment of the present invention will now be described with reference to FIG. 4. FIGS. 4A, 4B, and 4C illustrate deformation states by heat of the core tube 3. FIG. 4A illustrates a state before the temperature of the core tube 3 is raised, FIG. 4B illustrates a state of the core tube 3 after a few porous glass preforms are dehydrated and sintered by the rise of the temperature, and FIG. 4C illustrates a state of the core tube 3 after another few porous glass preforms are dehydrated and sintered from FIG. 4B.

In the state illustrated in FIG. 4A, each the short muffle tube 11 interposed between the adjacent up-and-down collars 14 is arranged to contact the upper surface of the collar 14 or to form a gap D1 between the short muffle tube 11 and the upper surface of the collar 14. A gap D2 is formed between the lower surface of the collar 14 and the short muffle tube 11.

In the state illustrated in FIG. 4B, the core tube 3 is heated and thus is stretched by its own weight. As a result, the gap D1 becomes larger and the gap D2 becomes smaller.

In the state illustrated in FIG. 4C, the core tube 3 is further stretched, and thus the gap D1 becomes further larger. The gap D2, on the other hand, becomes further smaller, and thus the lower surface of the collar 14 contacts the short muffle tube 11.

Figure 5:
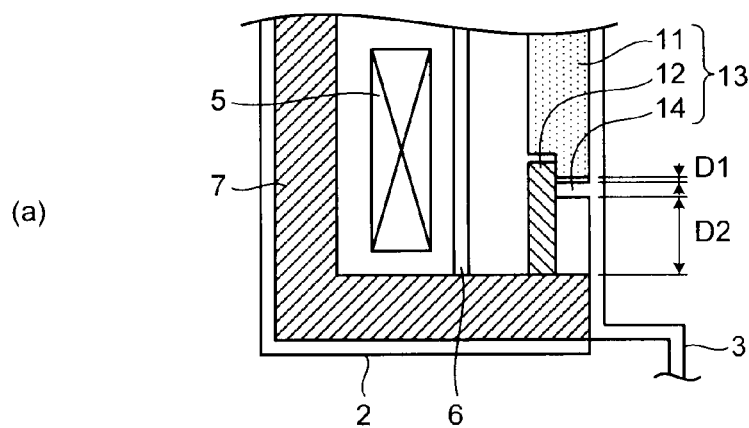
FIGS. 5A, 5B, and 5C are cross-sectional views schematically illustrating a deformation process by heat of the core tube in the vicinity of a collar arranged at the very bottom of the core tube in the furnace for dehydrating and sintering a porous glass preform according to the first embodiment.
Figure 5:
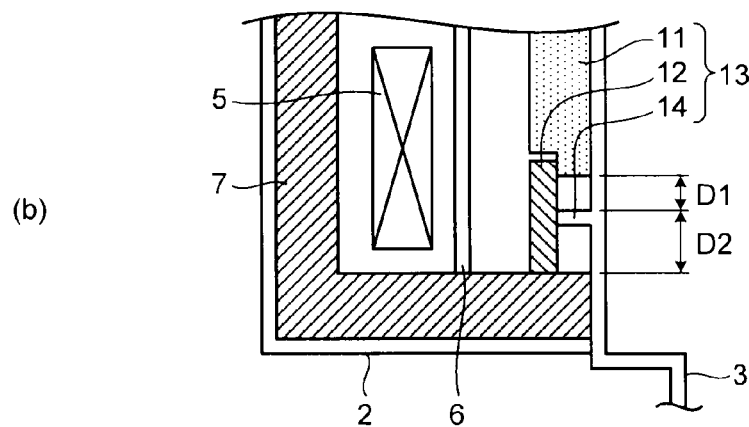
Figure 5:
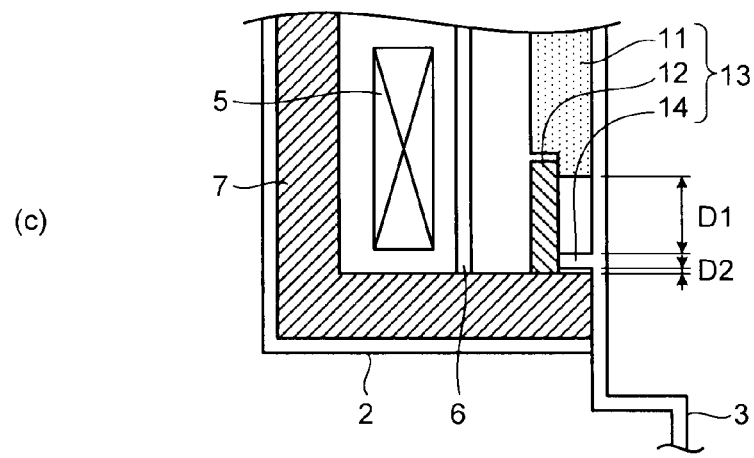

A deformation process of the core tube 3 in the vicinity of the collar 14 arranged at the very bottom of the core tube 3 will now be described with reference to FIG. 5. FIGS. 5A, 5B, and 5C illustrate deformation states of the core tube weight dividing and bearing means 13 that is arranged at the very bottom of the core tube 3 when the core tube 3 is heated. FIG. 5A illustrates a state before the temperature of the core tube 3 is raised, FIG. 5B illustrates a state of the core tube 3 after a few porous glass preforms are dehydrated and sintered by the rise of the temperature, and FIG. 5C illustrates a state of the core tube 3 after another few porous glass preforms are dehydrated and sintered from FIG. 5B.

In the state illustrated in FIG. 5A, the short muffle tube 11 placed on or above the collar 14 arranged at the very bottom of the core tube 3 is arranged to contact the upper surface of the collar 14 or to form a gap D1 between the short muffle tube 11 and the upper surface of the collar 14. A gap D2 is formed between the lower surface of the collar 14 and a heat insulating member 7.

In the state illustrated in FIG. 5B, the core tube 3 is heated and thus is stretched by its own weight. As a result, the gap D1 becomes larger and the gap D2 becomes smaller.

In the state illustrated in FIG. 5C, the core tube 3 is further stretched, and thus the gap D1 becomes further larger. The gap D2, on the other hand, becomes further smaller, and thus the lower surface of the collar 14 contacts the heat insulating member 7. Therefore, a part of the weight of the core tube 3 is directly imposed on the securely-fixed furnace body 2 through the heat insulating member 7.

As described above, the weight of the core tube 3 is divided and imposed on the short muffle tube 11. The weight of the short muffle tube 11 is divided and imposed on the muffle tube holder 12 and the short muffle tube 11, and is not imposed on the collar 14 of the core tube 3. The weights of the core tube 3, the short muffle tube 11, and the muffle tube holder 12 are ultimately imposed on the securely-fixed furnace body 2 through the heat insulating member 7.

Therefore, the buckling deformation of the core tube 3 can be suppressed by arranging the short muffle tube 11 that supports the collars 14 at the outer periphery of the core tube 3 and the muffle tube holder 12 that bears the weight of the short muffle tube 11.

The size of the gap D2 before the temperature rise of the core tube 3 is set in view of an amount of stretch by which the core tube 3 is stretched by its own weight when being heated at high temperature. For example, the size of the gap D2 is set to 20 mm to 50 mm.

As described above, the core tube weight dividing and bearing means 13 that divides and bears the weight of the core tube 3 in its longitudinal direction is arranged at the outer periphery of the core tube 3, and the core tube weight dividing and bearing means 13 includes the plurality of collars 14 that is arranged at the outer periphery of the core tube 3 at a predetermined interval in the longitudinal direction, the first weight receiving means 11 that supports the collars 14 at the outer periphery of the core tube 3, and the second weight receiving means 12 that supports the first weight receiving means 11 at the outer periphery of the collar 14 of the core tube 3. Therefore, the core tube 3 can be suppressed from buckling deformation caused by its own weight at the time of high-temperature heating since the weight of the first weight receiving means 11 is not imposed on the core tube 3.

As in the present example, the first weight receiving means 11 is configured by the short muffle tubes 11 of which each is interposed at the outer periphery of the core tube 3 between the adjacent up-and-down collars 14 to bear the weight of the core tube 3 acting on the upper-side collar 14 and the second weight receiving means 12 is configured by the muffle tube holders 12 of which each is interposed at the outer periphery of the collar 14 of the core tube 3 between the adjacent up-and-down short muffle tubes 11 to bear the weight of the short muffle tube 11. In this case, the weight of the core tube 3 is divided by and imposed on the plurality of short muffle tubes 11, and the weight divided by and imposed on the short muffle tubes 11 is further divided by and imposed on the muffle tube holders 12. Therefore, the load imposed on the core tube 3 can be suppressed small and also the weight of the core tube 3 can be easily divided into a plurality of parts in the longitudinal direction.

Figure 6:
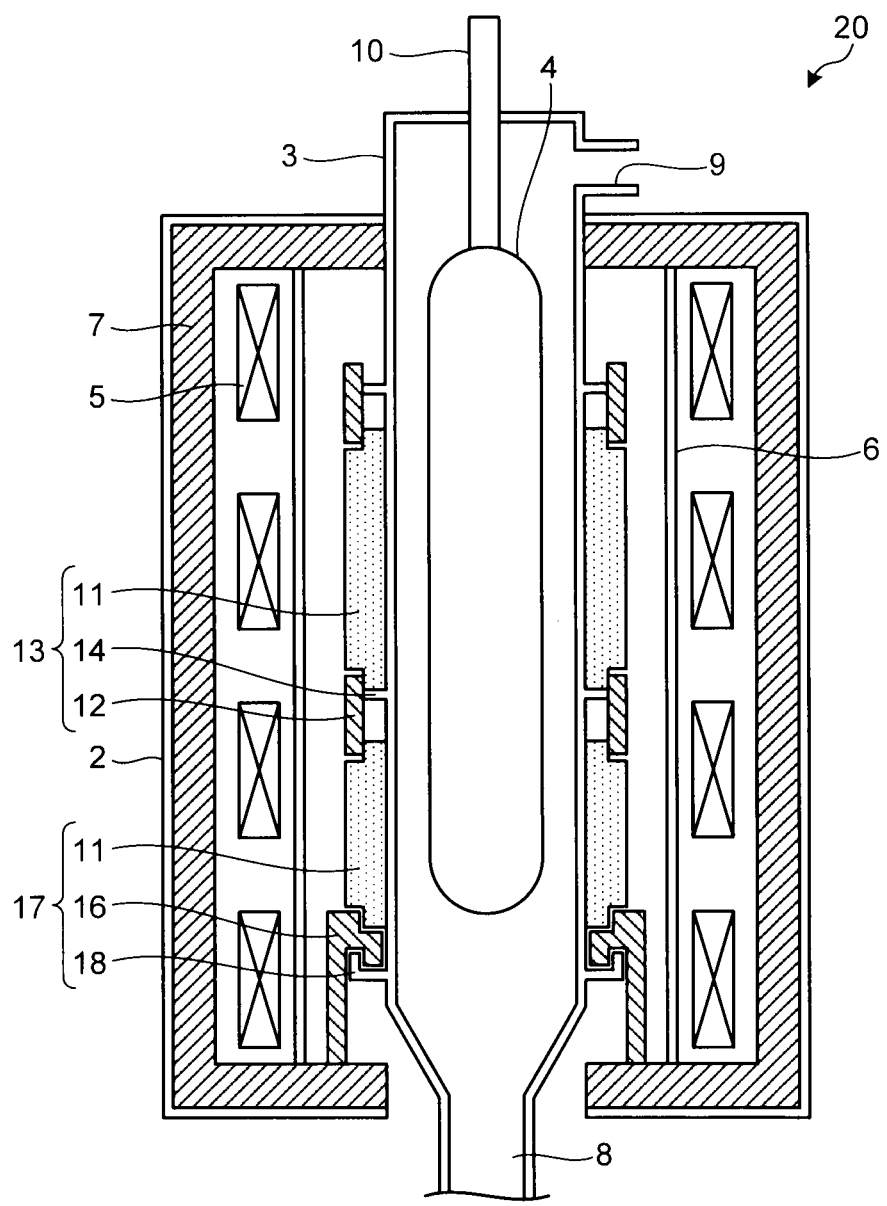
FIG. 6 is a cross-sectional view illustrating a furnace for dehydrating and sintering a porous glass preform according to a second embodiment.

FIG. 6 illustrates a furnace for dehydrating and sintering a porous glass preform according to a second embodiment of the present invention and is a schematic view illustrating a longitudinal cross section of the dehydration-sintering furnace.

A furnace 20 for dehydrating and sintering the porous glass preform 4 illustrated in FIG. 6 has the same configuration as that in the first embodiment except that a core tube weight dividing and bearing means 17 arranged at the very bottom of the core tube 3 has a shape different from that in the first embodiment. The components denoted with the same reference numerals as those of the dehydration-sintering furnace described above have the same configurations as those of the dehydration-sintering furnace described above.

The core tube weight dividing and bearing means 17 arranged at the very bottom of the core tube 3 includes a collar 18 that is arranged on the core tube 3, the first weight receiving means 11 that supports the collar 14 positioned above the collar 18, and a second weight receiving means 16 that supports the first weight receiving means 11. The collar 18 has an L-shaped cross-section, and thus an upward concave portion is formed at the outer periphery of the core tube 3 by the core tube 3 and the collar 18.

The first weight receiving means 11 is similar to that of the first embodiment, and is configured by the short muffle tube 11.

The second weight receiving means 16 is configured by a muffle tube holder 16 that bears the weight of the short muffle tube 11 acting on the short muffle tube 11. The muffle tube holder 16 is formed with a downward concave portion. The downward concave portion has a shape such that it can be fitted to the upward concave portion formed at the outer periphery of the core tube 3.

In this way, the collar 18 and the muffle tube holder 16 are stably fixed even at the lowermost part, and thus the assembly is facilitated.

Figure 7:
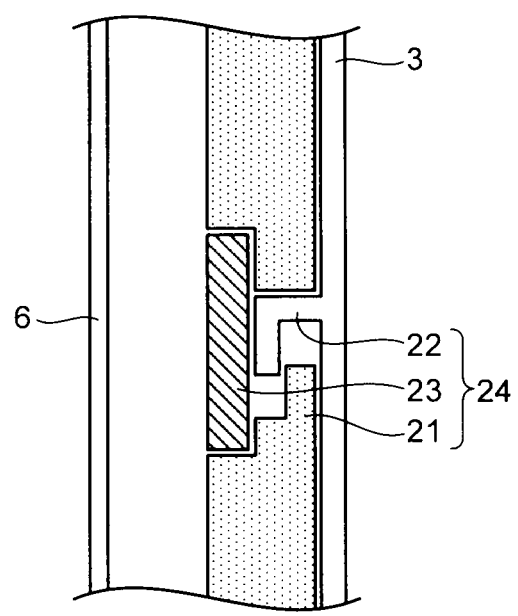
FIG. 7 is a cross-sectional view illustrating the vicinity of a collar arranged at a position other than the very bottom of a core tube according to a third embodiment.
Figure 8:
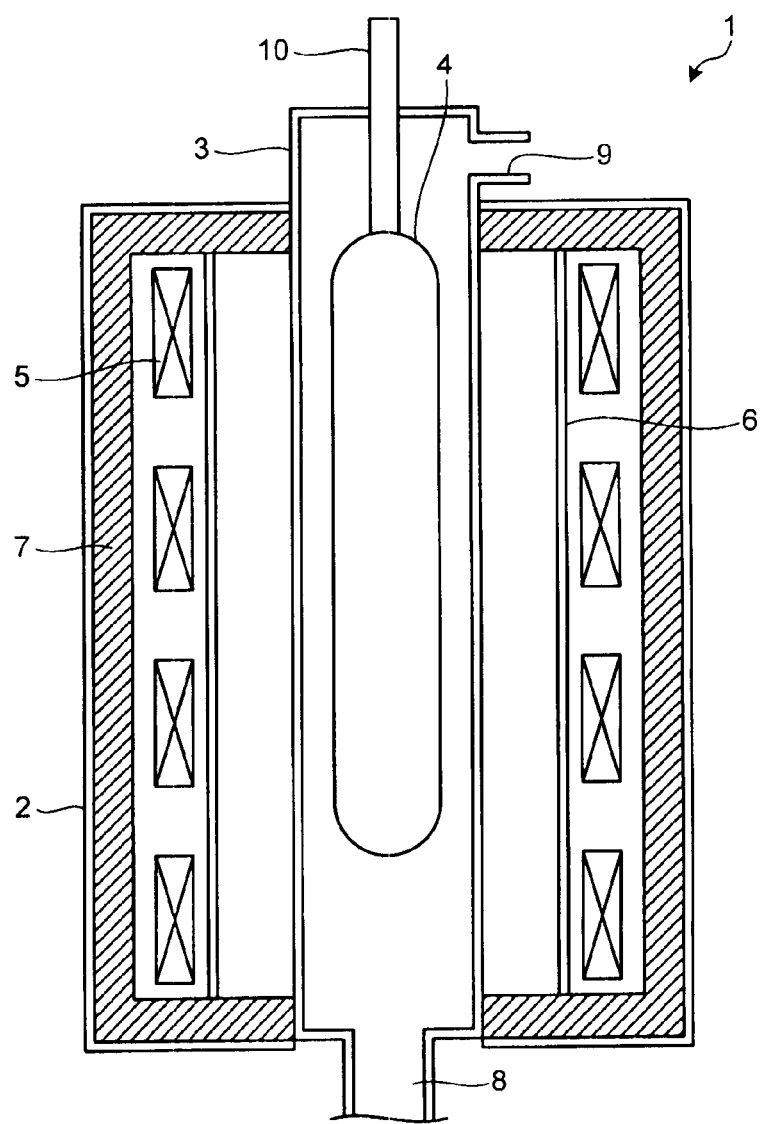
FIG. 8 is a cross-sectional view illustrating a conventional furnace for dehydrating and sintering a porous glass preform.

FIG. 7 illustrates a furnace for dehydrating and sintering a porous glass preform according to a third embodiment of the present invention and is a schematic view illustrating a cross section of the vicinity of a collar other than that of the very bottom of the core tube 3.

A core tube weight dividing and bearing means 24 arranged at the very bottom of the core tube 3 includes a collar 22 that is arranged on the core tube 3, a first weight receiving means 21 that supports the collar 22, and a second weight receiving means 23 that supports the first weight receiving means 21. The collar 22 of the core tube 3 has an L-shaped cross section, and thus a downward concave portion is formed at the outer periphery of the core tube 3. A short muffle tube 21 constituting the first weight receiving means 21 has an upper-side thin-walled portion and a lower-side thin-walled portion. The upper-side thin-walled portion is fitted to the collar 22 and fits a muffle tube holder 23 constituting the second weight receiving means 23. The lower-side thin-walled portion fits the muffle tube holder 23.

FIG. 7 further illustrates a state before the temperature of the core tube 3 is raised. A gap is formed between the lower surface of the collar 22 and the short muffle tube 21. However, the core tube 3 is heated and thus is stretched by its own weight so that the lower surface of the collar 22 contacts the short muffle tube 21, also in the configuration of FIG. 7 similarly to FIGS. 4A to 4C. Therefore, because the short muffle tube 21 is reliably fitted to the collar 22 of the core tube 3 and thus a part of the weight of the core tube 3 is imposed on the short muffle tube 21, the buckling deformation of the core tube 3 can be more reliably suppressed.

As a configuration of the vicinity of a collar, the present invention may have a combination of the third example that indicates the configuration of the vicinity of a collar other than that of the very bottom of a core tube and the first example that indicates the configuration of the vicinity of a collar of the very bottom of the core tube. Alternatively, the present invention may have a combination of the third example that indicates the configuration of the vicinity of a collar other than that of the very bottom of the core tube and the second example that indicates the configuration of the vicinity of a collar of the very bottom of the core tube.

The method for dividing and bearing the weight of a core tube as described above is particularly effective when a large-sized core tube of 35 kg or more is used. The present invention can be applied to a method for performing dehydration and sintering by moving a porous glass preform in the up and down directions with respect to a fixed heating body and also to a method for performing dehydration and sintering by fixing a porous glass preform and moving heating zones in the up and down directions by using a plurality of heating bodies. Furthermore, the present invention can be applied to a method for combining the above.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A furnace for dehydrating and sintering a porous glass preform, the furnace comprising:
   a core tube that passes through a center portion of a furnace body to accommodate therein the porous glass preform;
   a heater that is arranged around the core tube in the furnace body to heat the porous glass preform in the core tube; and
   a core tube weight dividing and bearing unit that is arranged at an outer periphery of the core tube to divide and bear a weight of the core tube in a longitudinal direction thereof, and
   the core tube weight dividing and bearing unit including a plurality of collars that are protruded at a predetermined interval in the longitudinal direction at the outer periphery of the core tube, a first weight receiving unit that supports the collars at the outer periphery of the core tube, and a second weight receiving unit that bears a weight of the first weight receiving unit.

2. The furnace for dehydrating and sintering the porous glass preform according to claim 1, wherein
- the first weight receiving unit is configured by muffle tubes of which each is interposed at the outer periphery of the core tube between the adjacent up-and-down collars to bear the weight of the core tube acting on the upper-side collar, and
- the second weight receiving unit is configured by muffle tube holders of which each is interposed at the outer periphery of the collar of the core tube between the adjacent up-and-down muffle tubes to bear the weight of the muffle tube acting on the upper-side muffle tube.

3. The furnace for dehydrating and sintering the porous glass preform according to claim 1, wherein the first weight receiving unit is arranged in such a manner that the weight of the core tube is not imposed on the first weight receiving unit before a temperature of the dehydration-sintering furnace is raised and the weight of the core tube is imposed on the first weight receiving unit when the temperature of the dehydration-sintering furnace is raised and the core tube is stretched by heating.

4. The furnace for dehydrating and sintering the porous glass preform according to claim 2, wherein the first weight receiving unit is arranged in such a manner that the weight of the core tube is not imposed on the first weight receiving unit before a temperature of the dehydration-sintering furnace is raised and the weight of the core tube is imposed on the first weight receiving unit when the temperature of the dehydration-sintering furnace is raised and the core tube is stretched by heating.

* * * * *